UNITED STATES PATENT OFFICE.

JOHN JOSEPH EASTICK, OF LONDON, AND JOHN JOSEPH ARTHUR DE WHALLEY, OF LEE, ENGLAND, ASSIGNORS TO THE MOLASSINE COMPANY LIMITED, OF EAST GREENWICH, ENGLAND.

MANUFACTURE OF FOOD FOR CATTLE AND OTHER ANIMALS.

1,147,489. Specification of Letters Patent. Patented July 20, 1915.

No Drawing. Application filed February 26, 1914. Serial No. 821,259.

*To all whom it may concern:*

Be it known that we, JOHN JOSEPH EASTICK and JOHN JOSEPH ARTHUR DE WHALLEY, subjects of the King of Great Britain and Ireland, and residents, respectively, of No. 2 St. Dunstans Hill, in the city of London, England, and Park House, Brandram Road, Lee, in the county of Kent, England, have invented new and useful Improvements in the Manufacture of Food for Cattle and other Animals, of which the following is a specification.

This invention relates to improvements in the manufacture of food for cattle and other animals, from sphagnum or peat moss or to food in which sphagnum forms an ingredient and it should be particularly noted that sphagnum or peat moss which is the upper and consequently more recently formed material is much more suitable for use in this connection than what is usually understood by the term "peat" namely the peat of much older formation.

It has already been proposed to treat ordinary peat and added water with steam under pressure for several hours in a closed vessel. It was stated that the humic acid of the peat, assisted by the pressure and water, converted the fiber partly into sugar and partly into vegetable gum but a very large proportion of the material obtained was insoluble fiber and the proportion of moisture as it came from the closed vessel was relatively large. The product obtained including the fiber was used as fodder while still wet or was dried or was separated from the fiber by pressure and made into an extract before being used. It has also been proposed to obtain sugar or to produce saccharine substances from cellulose or certain cellulose-containing bodies or from vegetable substances by treating the material contained in a closed vessel with an acid or acids in solution, such as sulfuric acid or hydrochloric acid or sulfurous acid or a mixture of two of these acids and then subjecting the material (with or without stirring) to steam under pressure, or hot water, or heat or mechanical pressure, for some time, and it has moreover been proposed to convert cellulose (such as sawdust) into sugar without the use of pressure by causing the vapor of sulfuric anhydrid (sulfur trioxid) or of a mixture of vapors of sulfuric anhydrid and sulfurous anhydrid (sulfur dioxid) to act on moist sawdust and the operation is stated to be accelerated by heating in a closed vessel, after the reaction of the acid or mixture of acids, to a temperature of about 257° F. (125° C.). The present applicants have also previously proposed to manufacture cattle food by subjecting sphagnum or peat moss for short time to heat and pressure in an autoclave or digester with or without the addition of a small percentage of a hydrolyzing agent, such as sulfurous acid in solution, but according to this invention, sphagnum or peat moss suitably containing no more than about 30% of natural moisture, is, put into an inclosed vessel such as an autoclave or digester which is preferably heated by steam and subjected for a short period or periods to the action of sulfur dioxid gas and steam under pressure.

A suitable method of carrying the invention into effect consists in putting say 100 parts by weight of sphagnum containing for example about 30% of moisture into a jacketed autoclave or digester and then introducing say, 3½ parts by weight or sulfur dioxid. When this amount of gas has been introduced, the supply of gas is then cut off and steam is admitted to the digester and about 100 lbs. pressure is maintained, for, say, half an hour, but in some circumstances, dependent upon the quality of the sphagnum or peat moss and the amount of moisture therein, the time required may be sensibly shorter or longer and it will be understood that the digester is also heated by passing steam into its jacket. The supply of steam is then stopped, steam is allowed to blow off and the product is turned out of the digester, when it will be found to contain much less moisture than is the case in carrying out the process forming the subject of the applicant's previous patent in Great Britain, No. 29648, dated December 24, 1912, before referred to.

Sphagnum moss or peat moss differs from ordinary peat in that it is lighter, more porous, contains less carbon, is much richer as indicated by the usual hydrochloric acid test for furfurol-yielding bodies, while under the miscroscope it shows typical fernlike structures, while peat shows amorphous particles and hardly any organized structures.

Peat moss or sphagnum moss contains practically no ligno-cellulose or lignin, but is practically pure cellulose or hydro-cellulose mixed with humus acids and pentosans, while saw-dust on the other hand is composed largely of lignin and ligno-cellulose and small amounts of cellulose and pentosans.

The action of the hydrolyzed sphagnum moss differs from hydrolyzed saw-dust, i. e., when subjected to a chemical treatment to partially convert them into sugar, by its action with respect to molasses.

A palatable cattle food can be made from hydrolyzed saw-dust only when mixed with cane sugar molasses, and cannot be mixed with beet sugar molasses, because there is not sufficient humus acid to act on the potash salts of beet molasses and the taste is so unpleasant that cattle will not eat it.

We claim:—

1. Process for the manufacture of food for cattle and other animals consisting in subjecting sphagnum to heat and to the action of sulfur dioxid gas and steam.

2. Process for the manufacture of food for cattle and other animals consisting in subjecting sphagnum to heat and to the action of sulfur dioxid gas and high pressure steam.

3. Process for the manufacture of food for cattle and other animals consisting in subjecting sphagnum to heat externally applied and to the direct action of sulfur dioxid gas and steam at high pressure.

4. Process for the manufacture of food for cattle and other animals consisting in subjecting approximately 100 parts by weight of sphagnum to heat and to the action of sulfur dioxid gas until approximately 3½ parts of weight of gas have been supplied, shutting off the supply of said gas and supplying steam at about 100 pounds pressure to act on the contents of the digester for about half an hour.

5. A cattle food comprising hydrolyzed sphagnum moss.

JOHN JOSEPH EASTICK.
JOHN JOSEPH ARTHUR DE WHALLEY.

Witnesses:
P. PHILLIPS,
O. J. WORTH